(12) United States Patent
Din et al.

(10) Patent No.: US 9,656,425 B2
(45) Date of Patent: May 23, 2017

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Jui-Feng Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/658,244

(22) Filed: Mar. 16, 2015

(65) Prior Publication Data
US 2016/0136894 A1 May 19, 2016

(30) Foreign Application Priority Data
Nov. 13, 2014 (CN) .......................... 2014 1 0640746

(51) Int. Cl.
*B33Y 30/00* (2015.01)
*B29C 67/00* (2017.01)
*B33Y 40/00* (2015.01)

(52) U.S. Cl.
CPC ...... *B29C 67/0085* (2013.01); *B29C 67/0055* (2013.01); *B33Y 30/00* (2014.12); *B33Y 40/00* (2014.12)

(58) Field of Classification Search
CPC ......... B33Y 10/00; B33Y 30/00; B33Y 40/00; B29C 67/0055; B29C 67/0085
See application file for complete search history.

(56) References Cited

U.S. PATENT DOCUMENTS

| 4,572,069 A | * | 2/1986 | Schwarzbeck | ......... B41K 3/126 |
| | | | | 101/216 |
| 6,718,876 B1 | * | 4/2004 | Williamsson | ........... B41F 13/30 |
| | | | | 101/153 |

(Continued)

FOREIGN PATENT DOCUMENTS

| JP | 2016525885 | 9/2016 |
| WO | WO2014190168 | 11/2014 |

OTHER PUBLICATIONS

"Office Action of Janpan Counterpart Application," issued on Feb. 21, 2017, p. 1-p. 3.

*Primary Examiner* — David Banh
(74) *Attorney, Agent, or Firm* — Jianq Chyun IP Office

(57) ABSTRACT

A three-dimensional printing apparatus including a housing, a platform disposed in the housing and having a printing region, a frame disposed on an inner side of the housing and an operating module is provided. At least one cylinder disposed on the frame has a body and a pair of wings extended therefrom. The cylinder is carried on the frame by the wings, and a first gap is provided below each of the wings and between the body and the frame. The operating module is disposed in the housing to move relative to the printing region and the frame, and the operating module includes a pair of catching arms. After the catching arms are inserted into the first gaps, the operating module moves in a first direction to carry the cylinder on the catching arms, and then moves in a second direction to move the cylinder out from the frame.

15 Claims, 7 Drawing Sheets

(56) References Cited

U.S. PATENT DOCUMENTS

| | | | |
|---|---|---|---|
| 7,814,831 B2 * | 10/2010 | Wientjens | B41F 5/24 101/219 |
| 2006/0117972 A1 * | 6/2006 | van de Bovenkamp | B41F 13/32 101/216 |
| 2006/0156978 A1 | 7/2006 | Lipson et al. | |
| 2008/0229958 A1 * | 9/2008 | Catelli | B31F 1/07 101/479 |
| 2010/0313775 A1 * | 12/2010 | Whitelaw | B41F 13/14 101/248 |

* cited by examiner

THREE-DIMENSIONAL PRINTING APPARATUS

CROSS-REFERENCE TO RELATED APPLICATION

This application claims the priority benefit of Chinese application serial no. 201410640746.9, filed on Nov. 13, 2014. The entirety of the above-mentioned patent application is hereby incorporated by reference herein and made a part of this specification.

BACKGROUND

Technical Field

The disclosure relates to a printing apparatus, and more particularly, relates to a three-dimensional printing apparatus.

Description of Related Art

In recent years, with advancement of technologies, many different methods have been proposed to build physical three-dimensional (3D) models by using an additive manufacturing technology for building a model layer by layer. Generally, in the additive manufacturing technology, design data of a 3D model built by computer-aided design (CAD) software or the like is transformed into a plurality of thin (quasi-two-dimensional) cross-sectional layers stacked over one another in succession. Recently, many technical means for forming the thin cross-sectional layers are also proposed. For example, a printing unit of the three-dimensional printing apparatus is usually moved above a platform in an XY plane with reference to space coordinates XYZ constructed according to the design data of the 3D model in order to form a correct shape of the cross-sectional layer by using a building material. Thereafter, by driving the printing unit to move along a Z axis layer by layer, the cross-sectional layers may be gradually stacked and cured layer by layer to form the 3D object.

Some three-dimensional printing apparatuses use a cylinder to fill the building material, and dispose the cylinder in the printing unit with a pressing head, such that the building material may be extruded to the outside by the pressing header. The cylinder is usually disposed on a bracket of the printing unit corresponding to the pressing head. When the building material in the cylinder is used up or when other cylinders are to be replaced based on demands, a replacement of the cylinder is usually performed manually. This replacement increases an operating cost for the three-dimensional printing apparatus as well as a required time for building the 3D object.

SUMMARY

The disclosure is directed to a three-dimensional printing apparatus, which is capable of automatically replacing a cylinder in order to reduce the operating cost required by the three-dimensional printing apparatus.

The disclosure provides a three-dimensional printing apparatus, which includes a housing, a platform, a frame and an operating module. The platform is disposed in the housing. The platform has a printing region. The frame is disposed on an inner side of the housing, and at least one cylinder is disposed on the frame. The cylinder has a body and a pair of wings extended from the body. The wings are located at two opposite sides of the body and faced away from each other. The cylinder is carried on the frame by the wings, and a first gap is provided below each of the wings and between the body and the frame. The operating module is disposed in the housing to move relative to the printing region of the platform and the frame, and the operating module includes a pair of catching arms. After the catching arms are inserted into the first gaps, the operating module moves in a first direction to carry the cylinder on the catching arms, and then moves in a second direction to move the cylinder out from the frame.

Based on the above, in the three-dimensional printing apparatus of the disclosure, the three-dimensional printing apparatus includes the housing, the platform, the frame and the operating module. The cylinder is disposed on the frame by the wings, and the first gap is provided below each of the wings and between the body and the frame. As such, after the catching arms are inserted into the first gaps, the operating module moves in the first direction to carry the cylinder on the catching arms. Then, the operating module moves in the second direction to move the cylinder out from the frame in order to perform the subsequent printing operation. Accordingly, the three-dimensional printing apparatus of the disclosure is capable of automatically replacing the cylinder in order to reduce the operating cost required by the three-dimensional printing apparatus.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
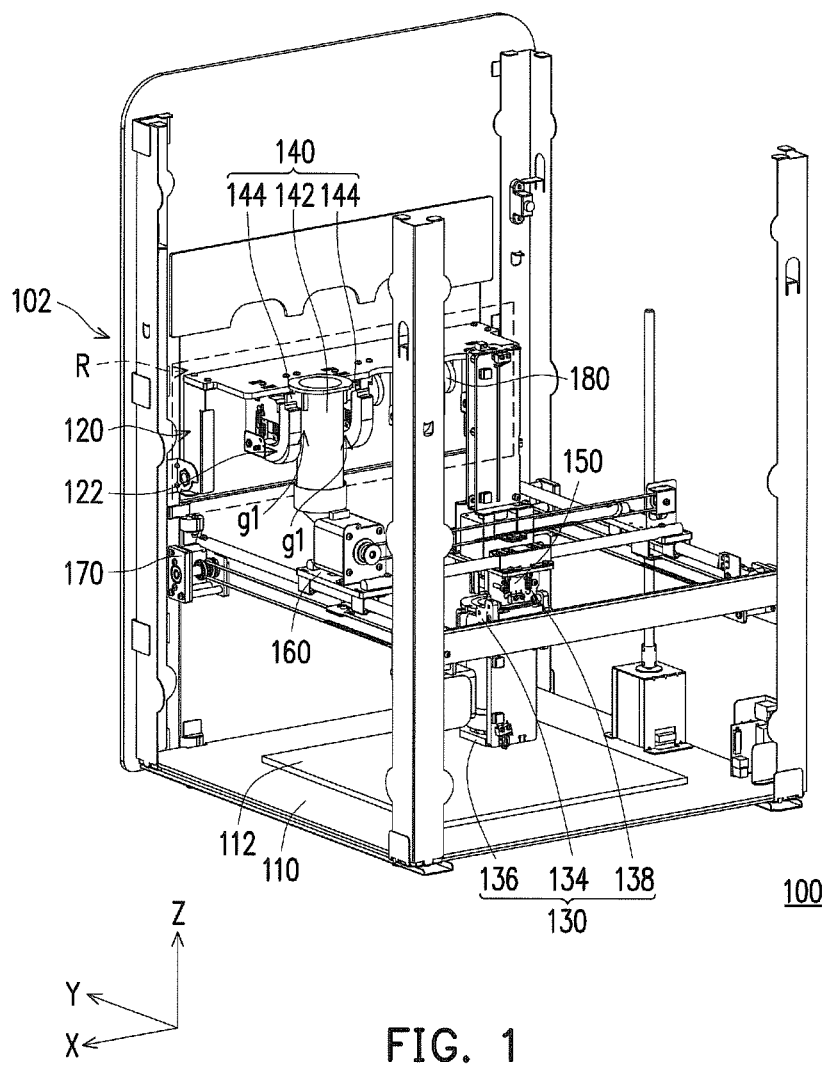
FIG. 1 is a schematic diagram of a three-dimensional printing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
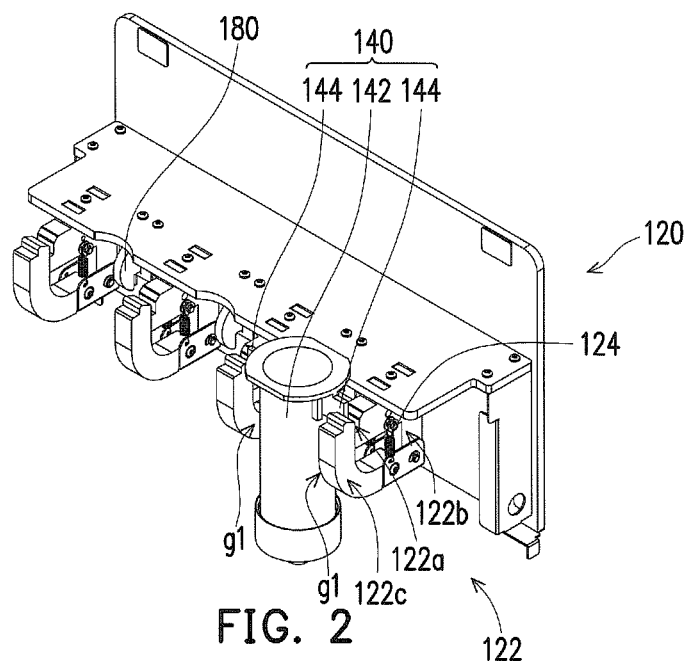
FIG. 2 is a schematic diagram of a frame of the three-dimensional printing apparatus in FIG. 1.
Figure 3:
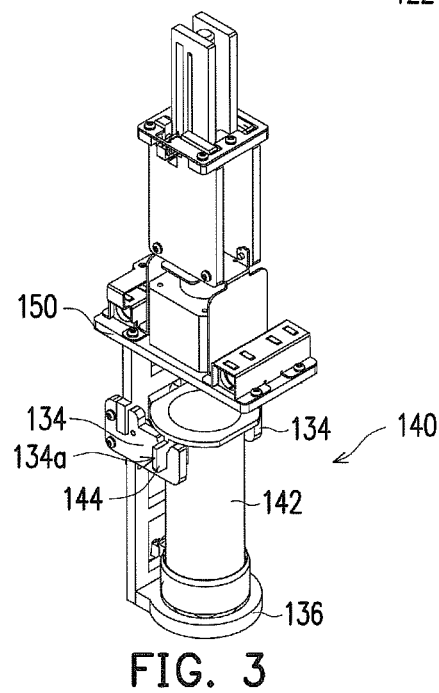
FIG. 3 is a schematic diagram of an operating module of the three-dimensional printing apparatus in FIG. 1.

FIG. 1 is a schematic diagram of a three-dimensional printing apparatus according to an embodiment of the disclosure. FIG. 2 is a schematic diagram of a frame of the three-dimensional printing apparatus in FIG. 1. FIG. 3 is a schematic diagram of an operating module of the three-dimensional printing apparatus in FIG. 1. Referring to FIG. 1 to FIG. 3, in the present embodiment, a three-dimensional printing apparatus 100 includes a housing 102, a platform 110, a frame 120 and an operating module 130. The platform 110 is disposed in the housing 102 and has a printing region 112. The frame 120 is disposed on an inner side of the housing 102, and at least one cylinder 140 is disposed on the frame 120. The operating module 130 is disposed in the housing 102 to move relative to the printing region 112 of the platform 110 and the frame 120, and the operating module 130 includes a pair of catching arms 134. Accordingly, the operating module 130 is capable of moving relative to the printing region 112 of the platform 110 to perform a printing operation, and moving relative to the frame 120 to take out the cylinder 140 from the frame 120 by the catching arms 134 (as illustrated in FIG. 3).

The operating module 130 of the present embodiment further includes a plurality of moving units disposed on the platform 110, such as a first moving unit 150, a second moving unit 160 and a third moving unit 170 which are depicted in FIG. 1. The catching arms 134 are disposed on the first moving unit 150 (e.g., disposed on a supporting plate extended from the first moving unit 150) to move relative to the platform 110 along a first axial direction (e.g., an axial direction X in FIG. 1) by the first moving unit 150. Similarly, the first moving unit 150 and the catching arms 134 disposed thereon are further disposed on the second moving unit 160 to move relative to the platform 110 along a second axial direction (e.g., an axial direction Y in FIG. 1) perpendicular to the first axial direction (e.g., the axial direction X in FIG. 1) by the second moving unit 160. Further, the second moving unit 160, and the first moving unit 150 and the catching arms 134 disposed thereon may be further disposed on the third moving unit 170 to move relative to the platform 110 along a third axial direction (e.g., an axial direction Z in FIG. 1) perpendicular to the second axial direction (e.g., the axial direction Y in FIG. 1) and the first axial direction (e.g., the axial direction X in FIG. 1) by the third moving unit 170. However, the disclosure is not intended to limit usage and implementation of the moving units, which may be adjusted based on demands. In view of above, the operating module 130 may move relative to the platform 110 to adjust a spatial position of the operating module 130 above the platform 110, and then extrude a building material (not illustrated) in the cylinder 140 onto the printing region 112 of the platform 110 to be stacked layer by layer, so as to build a desired 3D object (not illustrated). Accordingly, the three-dimensional printing apparatus 100 of the present embodiment may further utilize a mobility of the operating module 130, so that the operating module 130 may move relative to the frame 120 outside the platform 110 to automatically take out the cylinder 140 from the frame 120.

Specifically, in the present embodiment, the cylinder 140 has a body 142 and a pair of wings 144 extended from the body 142. The body 142 is in a cylinder shape, and the building material (not illustrated) may be filled therein. The wings 144 are located at two opposite sides of an outer surface of the body 142 and faced away from each other. Accordingly, the cylinder 140 is carried on the frame 120 by the wings 144. More specifically, the frame 120 of the present embodiment includes a plurality of supporting arms 122, and each of the supporting arms 122 has an engaging recess 122a. The frame 120 may be a part of the housing 102 of the three-dimensional printing apparatus 100, and the supporting arms 122 are disposed on the inner side of the housing 102 and facing towards the operating module 130. Furthermore, a region R of the housing 102 corresponding to the frame 120 may be made as a door cap so that the frame 120 may be opened to outside the housing 102 relative to other parts of the housing. As such, the cylinder 140 may be placed on the frame 120 from outside the housing 102 or the cylinder 140 may be taken out from the frame 120 to outside the housing 102. Later, the door cap may be closed so that the frame 120 may be restored back inside the housing 102. Nevertheless, the disclosure is not intended to limit shape and implementation of the frame 120. Accordingly, the supporting arms 122 are arranged in intervals on the part of the housing 102 served as the frame 120, such that the cylinder 140 may be disposed between adjacent two of the supporting arms 122, and the cylinder 140 is engaged with the engaging recesses 122a of the corresponding supporting arms 122 by the wings 144. However, in other embodiments, the cylinder 140 may also be disposed on the frame 120 by other suitable means, which are not particularly limited in the disclosure. At this time, in order to assist the operating module 130 for picking up the cylinder 140 in the subsequent operating process, after the cylinder 140 is carried on the frame 120 by the wings 144, it is more preferable to include a first gap g1 (illustrated in FIG. 2) which is provided below each of the wings 144 and between the body 142 and the frame 120.

Figure 4:
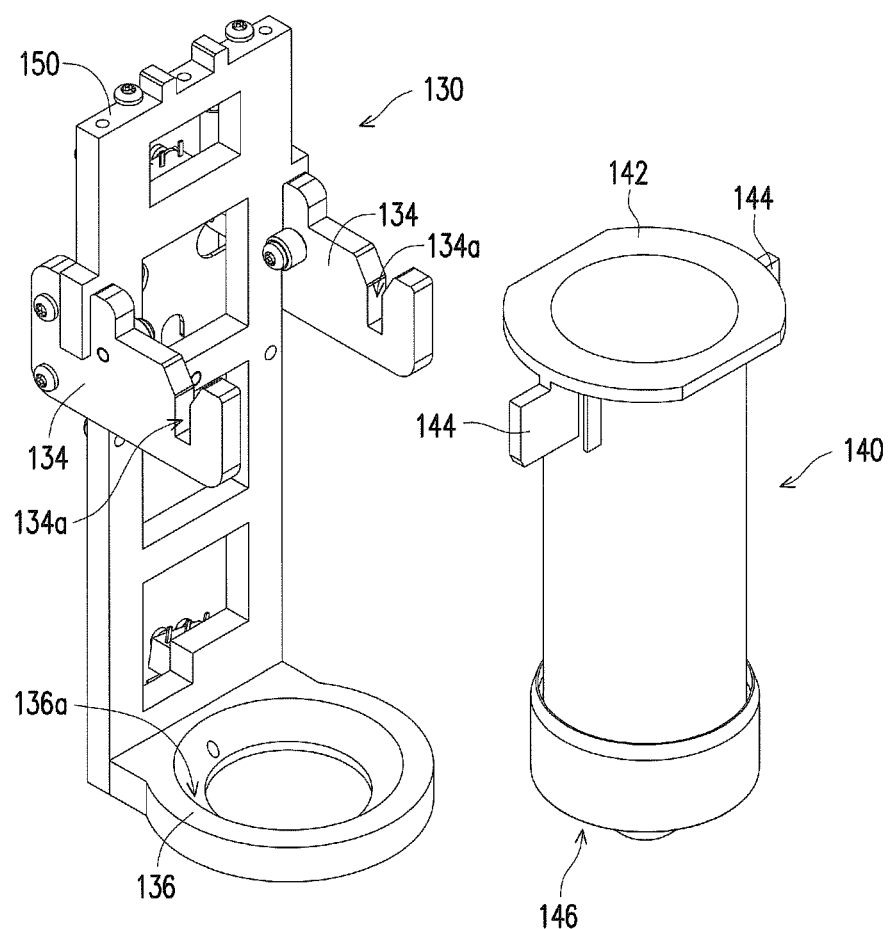
FIG. 4 is a schematic diagram of the operating module and the cylinder in FIG. 1.

FIG. 4 is a schematic diagram of the operating module and the cylinder in FIG. 1. Referring to FIG. 1 to FIG. 4, in the present embodiment, similarly, in order to pick up the cylinder 140 having the wings 144, each of the catching arms 134 of the operating module 130 includes an engaging hook 134a. Accordingly, after the catching arms 134 are correspondingly inserted into the first gaps g1 (illustrated in FIG. 2) provided below each of the wings 144 and between the body 142 and the frame 120, the operating module 130 moves in a first direction to carry the cylinder 140 on the catching arms 134, and the catching arms 134 are adapted to engage the wings 144 with the engaging hooks 134a. Said first direction is parallel to the third axial direction (e.g., the axial direction Z in FIG. 1). By the design of the engaging hook 134a, the cylinder 140 may be carried on the catching arms 134 more stably, but the disclosure is not limited thereto. Thereafter, the operating module 130 may continue to move in the first direction to move out the cylinder 140 from the frame 120, or may move in a second direction to move out the cylinder 140 from the frame 120. Said second direction is parallel to the second axial direction (e.g., the axial direction Y in FIG. 1). Accordingly, by using aforesaid moving units, the operating module 130 may move relative to the platform 110 based on demands and may also move relative to the frame 120, so as to pick up the cylinder 140 from the frame 120. An operating method for automatically picking up the cylinder 140 from the frame 120 by the three-dimensional printing apparatus 100 of the present embodiment is described in text below by reference with FIG. 5, FIG. 6A to FIG. 6C or FIG. 7 in sequence.

Figure 5:
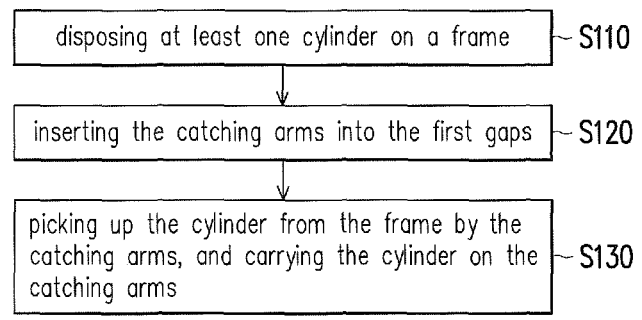
FIG. 5 is a flowchart illustrating operations of the three-dimensional printing apparatus in FIG. 1.
Figure 6A:
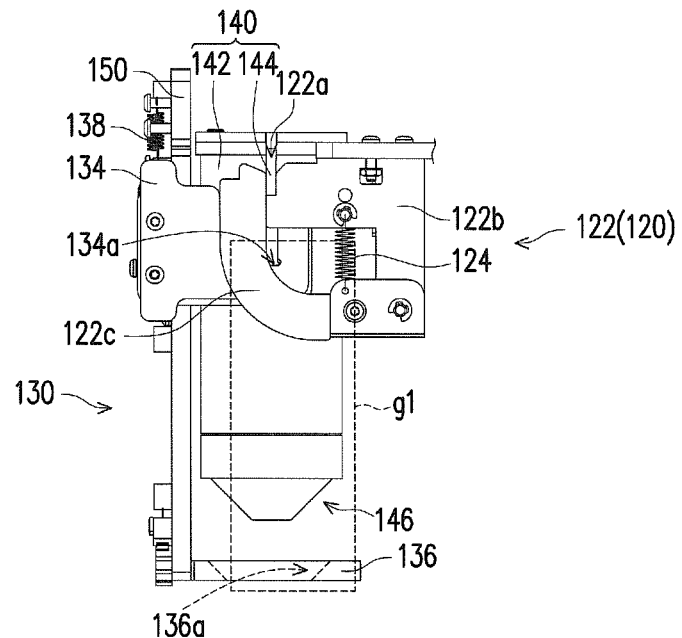
FIG. 6A to FIG. 6C are schematic diagrams illustrating a process of disposing the cylinder by the operating module of the three-dimensional printing apparatus in FIG. 1.
Figure 6B:
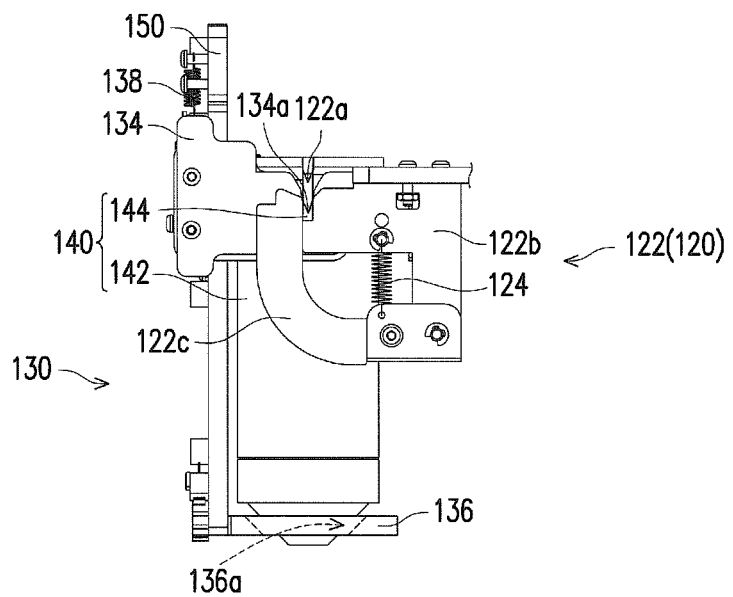
Figure 6C:
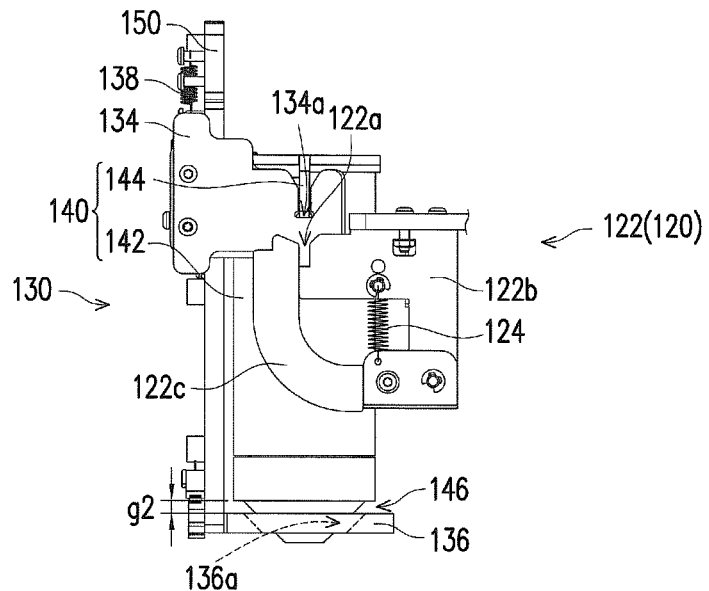

FIG. 5 is a flowchart illustrating operations of the three-dimensional printing apparatus in FIG. 1. FIG. 6A to FIG. 6C are schematic diagrams illustrating a process of disposing the cylinder by the operating module of the three-dimensional printing apparatus in FIG. 1. First, referring to FIG. 5 and FIG. 6A, in the present embodiment, the operating method of the three-dimensional printing apparatus 100 includes the following steps. In step S110, the at least one cylinder 140 is disposed on the frame 120. Subsequently, in step S120, the catching arms 134 are inserted into the first gaps g1. Specifically, the cylinder 140 is disposed on the frame 120, and the first gap g1 is provided below each of the wings 144 and between the body 142 and the frame 120, as shown in FIG. 2 and FIG. 6A. Structures of the frame 120 and the cylinder 140 may refer to the descriptions above, which are not repeated hereinafter. Accordingly, the operating module 130 may be driven by aforesaid moving units to move relative to the frame 120 until the operating module 130 is under the cylinder 140, such that the catching arms 134 may be inserted in the first gaps g1. At this time, the engaging hooks 134a of the catching arms 134 are located right under the wings 144.

Subsequently, referring to FIG. 5, FIG. 6B and FIG. 6C, in the present embodiment, the operating method of the three-dimensional printing apparatus 100 further including the following step. In step S130, the cylinder 140 is picked up from the frame 120 by the catching arms 134, and the cylinder 140 is carried on the catching arms 134. Specifically, in this step, the first moving unit 150 is driven to move the catching arms 134 upwardly together with the first moving unit 150 along the first direction, and the first direction is parallel to aforesaid third axial direction (i.e., the axial direction Z in FIG. 1), such that the catching arms 134 engage the wings 144 with the engaging hooks 134a as shown in FIG. 6B. At this stage, the operating module 130 moves in aforesaid first direction to carry the cylinder 140 on the catching arms 134. Thereafter, referring to FIG. 6C, the first moving unit 150 drives the operating module 130 to continue moving in the first direction, so that the cylinder 140 is carried on the catching arms 134 and detached from the frame 120. Similarly, the operating module 130 may also perform an inverse action with respect to aforesaid steps so that the catching arms 134 moves downwardly together with the first moving unit 150 along the first direction to place the cylinder 140 on the frame 120, but the disclosure is not limited thereto.

Lastly, after the operating module 130 moves out the cylinder 140 from the frame 120 by the catching arms 134, the operating module 130 then moves the cylinder 140 in the second direction to move the cylinder 140 to the printing region 112 (illustrated in FIG. 1). Said second direction is parallel to aforesaid second axial direction (i.e., the axial direction Y in FIG. 1). In other words, after the cylinder 140 is automatically disposed on the catching arms 134 by aforesaid steps, the operating module 130 may move to the printing region 112 of the platform 110 by aforesaid moving units to perform subsequent operations for three-dimensional printing. However, the three-dimensional printing apparatus 100 of the disclosure is not limited to the above steps. Further descriptions are provided in text below by reference with FIG. 7.

Figure 7:
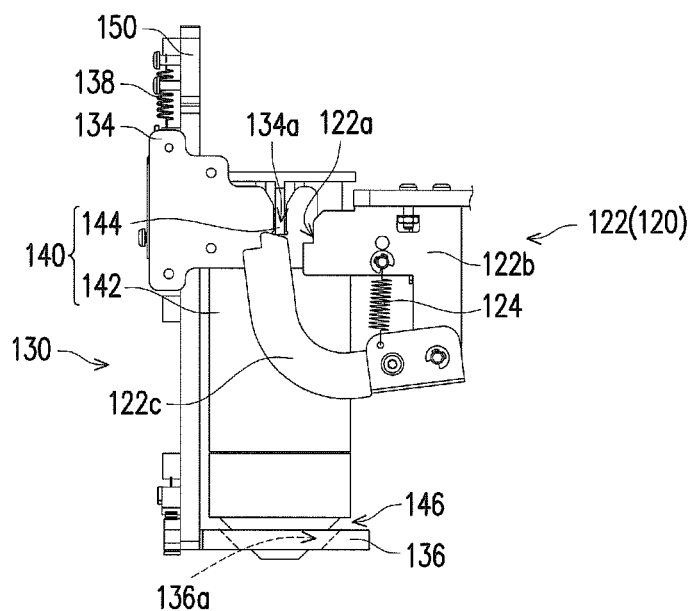
FIG. 7 is a schematic diagram illustrating another process of disposing the cylinder by the operating module of the three-dimensional printing apparatus in FIG. 1.

FIG. 7 is a schematic diagram illustrating another process of disposing the cylinder by the operating module of the three-dimensional printing apparatus in FIG. 1. Referring to FIG. 2, FIG. 6A to FIG. 6B and FIG. 7, in the present embodiment, each of the supporting arms 122 on the frame 120 may practically be movable supporting members. For instance, each of the supporting arms 122 includes a fixed part 122b and a movable part 122c. The fixed part 122b is disposed on an inner side of the part of the housing 102 served as the frame 120, and the movable part 122c is pivoted to the fixed part 122b as shown in FIG. 2 and FIG. 7. The movable part 122c is adapted to rotate relative to the fixed part 122b by a force to move a protrusion of the movable part 122c close to or away from a protrusion of the fixed part 122b. When the protrusion of the movable part 122c moves close to and pushes against the protrusion of the fixed part 122b, the protrusion of the movable part 122c and the protrusion of the fixed part 122b form the engaging recess 122a. In other words, the engaging recess 122a is constituted by the protrusion of the fixed part 122b and the protrusion of the movable part 122c contacted to each other. Accordingly, the cylinder 140 carried on the frame 120 may push the protrusion of the movable part 122c by the wings 144 engaged with the engaging recesses 122a to rotate the protrusion of the movable part 122c relative to the protrusion of the fixed part 122b. Accordingly, after the operating module 130 moves in the first direction (i.e., the axial direction Z in FIG. 1) to carry the cylinder 140 on the catching arms 134 (as shown in FIG. 6), the operating module 130 moves the cylinder 140 in the second direction (i.e., the axial direction Y in FIG. 1), such that the cylinder 140 may push the movable part 122c by the wings 144 to rotate relative to the fixed part 122b. Accordingly, the protrusion of the movable part 122c may move away from the protrusion of the fixed part 122b, so as to detach the cylinder 140 from the frame 120.

Further, in the present embodiment, each of the supporting arms 122 further includes a repositioning member 124, which is connected between the fixed part 122b and the movable part 122c. The repositioning member 124 is, for example, a spring or other suitable elements, and the repositioning member 124 constantly drives the protrusion of the movable part 122c to move close to and push against the protrusion of the fixed part 122b. Accordingly, when the operating module 130 moves the cylinder 140 in the second direction (i.e., the axial direction Y in FIG. 1), the repositioning member 124 may generate deformation and accumulate a repositioning force by a relative motion between the movable part 122c and the fixed part 122b. After the wings 144 of the cylinder 140 are detached from the engaging recesses 122a and no longer in contact with the movable part 122c, the cylinder 140 is detached from the frame 120, and the repositioning member 124 drives the protrusion of the movable part 122c to move close to and push against the protrusion of the fixed part 122b by the repositioning force. That is, the repositioning member 124 is capable of automatically repositioning the movable part 122c rotated relative to the fixed part 122b.

In view of above, in the present embodiment, after the cylinder 140 is carried on the catching arms 134 (as shown in FIG. 6B), the operating module 130 may move in the first direction (i.e., the axial direction Z in FIG. 1) to pick up the cylinder 140 (as shown in FIG. 6C) and then move in the second direction to the printing region 112. Alternatively, after the cylinder 140 is carried on the catching arms 134 (as shown in FIG. 6B), the operating module 130 may move in the second direction (i.e., the axial direction Y in FIG. 1) and push the movable supporting arms 122 to pick up the cylinder 140. Accordingly, the design of the supporting arms 122 in the present embodiment allows the three-dimensional printing apparatus 100 to include two operating paths (i.e., a picking path in FIG. 6A to FIG. 6C and a picking path in FIG. 6A to FIG. 6 and FIG. 7). Under normal operation, since it is not required for the operating module 130 to contact the frame 120 in a first operating path (i.e., the picking path in FIG. 6A to FIG. 6C), this path may serve as a major operating path. In this case, a second operating path (i.e., the picking path in FIG. 6B to FIG. 6C and FIG. 7) may serve as an operating path used when the major operating path fails. In other words, when the first operating path cannot be used because of problems occurred during the operating process of the three-dimensional printing apparatus 100, the operating module 130 may also pick up the cylinder 140 by using the second operating path which requires the frame 120 to be contacted. In this case, because the supporting arms 122 of the present embodiment are movable, the supporting arms 122 cannot be damaged even if the operating module 130 drives the cylinder 140 to contact the supporting arms 122. However, the disclosure is not limited thereto. The three-dimensional printing apparatus 100 may adjust its operating paths based on demands.

Figure 8:
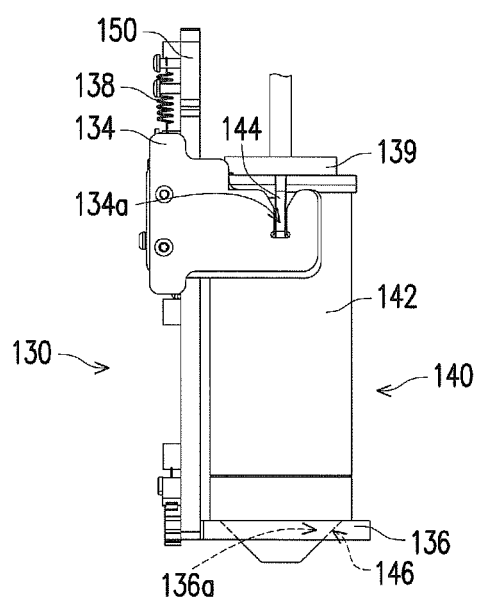
FIG. 8 is a schematic diagram illustrating operations of the operating module and the pressing unit of the three-dimensional printing apparatus in FIG. 6C and FIG. 7.

FIG. 8 is a schematic diagram illustrating operations of the operating module and the pressing unit of the three-dimensional printing apparatus in FIG. 6C and FIG. 7. Referring to FIG. 4, FIG. 6A to FIG. 8, in the present embodiment, the operating module 130 further includes a supporting ring 136, and the catching arms 134 are located between the supporting ring 136 and the first moving unit 150. When the cylinder 140 is carried on the catching arms 134, at least a part of the cylinder 140 is carried on the supporting ring 136. Specifically, the cylinder 140 is carried on the catching arms 134 by the wings 144, a bottom of the cylinder 140 is corresponding to the supporting ring 136, and the bottom of the cylinder 140 may go through the supporting ring 136. An inner wall of the supporting ring 136 has a first inclined surface 136a, and the bottom of the cylinder 140 has a second inclined surface 146. The first inclined surface 136a is corresponding to the second inclined surface 146 and configured to guide the bottom of the cylinder 140 to go through the supporting ring 136. When the cylinder 140 is carried on the catching arms 134 by the wings 144, the bottom of the cylinder 140 is carried on the supporting ring 136, and the first inclined surface 136a and the second inclined surface 146 may be contacted to each other so that the cylinder 140 may be stably carried between the catching arms 134 and the supporting ring 136. Nonetheless, in the present embodiment, a second gap g2 may also be provided between the cylinder 140 and the supporting ring 136.

Specifically, in the present embodiment, the operating module 130 further includes an elastic member 138, which is connected between the catching arms 134 and the first moving unit 150. The elastic member 138 constantly drives the catching arms 134 to move close to the first moving unit 150 so that the second gap g2 is provided between the cylinder 140 and the supporting ring 136 when the cylinder 140 is carried on the catching arms 134. In other words, by disposing the elastic member 138, the catching arms 134 of the present embodiment are capable of moving relative to the first moving unit 150. When the cylinder 140 is not carried on the catching arms 134, it is more preferable that the elastic member 138 stays in a non-deformation state. After the cylinder 140 is carried on the catching arms 134, the elastic member 138 may be slightly deformed due to weight of the cylinder 140. Yet, the elastic member 138 may still drive the catching arms 134 to move close to the first moving unit 150 so that the second gap g2 is provided between the cylinder 140 and the supporting ring 136. In other words, there is still a space for the elastic member 138 to deform, so that the catching arms 134 may still move relative to the supporting ring 136.

In the present embodiment, after the cylinder 140 is automatically carried on the catching arms 134 and detached from the frame 120 by aforesaid step (i.e., in states as shown in FIG. 6C or FIG. 7), the operating module 130 may move to the printing region 112 of the platform 110 by aforesaid moving units, and perform the printing operation by the cylinder 140. The printing operation refers to forming the 3D object (not illustrated) on the printing region 112 by using the building material (not illustrated) in the cylinder 140. Means for forming the building material in the cylinder 140 on the printing region 112 may be, for example, extruding the building material in the cylinder 140 out towards to the printing region 112. Accordingly, in the present embodiment, the operating module 130 further includes a pressing unit 139, which is disposed on one side of the catching arms 134. After the cylinder 140 is carried on the catching arms 134, the pressing unit 139 moves relative to the catching arms 134 and pushes against the cylinder 140, so as to secure the cylinder 140 in between the pressing unit 139 and the catching arms 134.

As such, in the present embodiment, the catching arms 134 being movable by the design of the elastic member 138 aim to allow the cylinder 140 to move in a distance of the second gap g2 to completely push against the supporting ring 136 and deform the elastic member 138 when the pressing unit 139 pushes against the cylinder 140. In other words, the elastic member 138 allows the catching arms 134 to have a space for moving relative to the first moving unit 150 and the supporting ring 136. As such, when the pressing unit 139 pushes against the cylinder 140, the catching arms 134 may move together with the cylinder 140 until the bottom of the cylinder 140 completely pushes against the supporting ring 136 and the first inclined surface 136a contacts the second inclined surface 146. As such, even if the second gap g2 is provided between the cylinder 140 and the supporting ring 136 after the cylinder 140 is carried on the catching arms 134, the catching arms 134 and the cylinder 140 may also be pushed by the pressing unit 139 to move until the bottom of the cylinder 140 pushes against the supporting ring 136, so as to secure the cylinder 140 in between the catching arms 134, the supporting ring 136 and the pressing unit 139. Meanwhile, the action of the pushing unit 139 pushing against the cylinder 140 does not cause damages to the catching arms 134.

In view of above, the three-dimensional printing apparatus 100 of the present embodiment further utilizes the mobility of the operating module 130 so that the operating module 130 may automatically take out the cylinder 140 from the frame 120. Accordingly, in order to ensure that the operating module 130 can accurately move to a corresponding place of the frame 120 on which the cylinder 140 is disposed, it is more preferable that at least one detecting unit 180 (illustrated in FIG. 2) is disposed in the three-dimensional printing apparatus 100. Referring to FIG. 2 to FIG. 4, the detecting unit 180 is disposed on the frame 120 and electrically connected to the operating module 130 and a control unit (not illustrated). The detecting unit 180 may be disposed between adjacent two of the supporting arms 122, so that the cylinder 140 subsequently disposed on the supporting arms 122 is corresponding to the detecting unit 180. Accordingly, the detecting unit 180 may be used to detect whether the cylinder 140 is located on the frame 120. When the operating module 130 moves relative to the frame 120 and performs aforesaid picking operation, based on a detection result of the detecting unit 180, the control unit (not illustrated) may control the operating module 130 to move by aforesaid moving units to the corresponding place of the frame 120 on which the cylinder 140 is still carried. When the cylinder 140 is picked up by the catching arms 134 from the frame 120 by aforesaid step, the detecting unit 180 may detect and learn that the cylinder 140 is no longer on the corresponding place of the frame 120. Later, when the operating module 130 intends to perform another picking operation, based on the detection result of the detecting unit, the control unit may drive the operating module 130 to move to the corresponding place of the frame 120 on which the cylinder 140 is still carried. However, whether the detecting unit 180 is disposed or not is not limited in the disclosure, which may be adjusted based on demands.

In summary, in the three-dimensional printing apparatus of the disclosure, the three-dimensional printing apparatus includes the housing, the platform, the frame and the operating module. The cylinder is disposed on the frame by the wings, and the first gap is provided below each of the wings and between the body and the frame. As such, after the catching arms are inserted into the first gaps, the operating module moves in the first direction to carry the cylinder on the catching arms. Then, the operating module moves in the second direction to move the cylinder out from the frame and then moves to the printing region to perform the subsequent printing operation. In addition, the catching arms are connected to the first moving unit by the elastic member to become a movable member. When the pressing unit pushes the cylinder to perform the printing operation, the catching arms and the cylinder may move and push against the supporting arms by the deformation of the elastic member, so as to prevent the catching arms from damages by the pressing unit. Accordingly, the three-dimensional printing apparatus of the disclosure is capable of automatically replacing the cylinder in order to reduce the operating cost required by the three-dimensional printing apparatus.

Lastly, it should be noted that, the above embodiments merely serve as examples in the present embodiment, and the disclosure is not limited thereto. Despite that the disclosure has been described with reference to above embodiments, it will be apparent to those skilled in the art that various modifications and variations can be made to the structure of the technical content disclosed in above embodiments of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing apparatus, comprising:
   a housing;
   a platform, disposed in the housing, and the platform having a printing region;
   a frame, disposed on an inner side of the housing, at least one cylinder being disposed on the frame, the cylinder having a body and a pair of wings extended from the body, the pair of wings being located at two opposite sides of the body and faced away from each other, the cylinder being carried on the frame by the pair of wings, and a first gap provided below each of the wings and between the body and the frame; and
   an operating module, disposed in the housing and moving relative to the printing region of the platform and the frame, the operating module comprising a pair of catching arms, and after the pair of catching arms being inserted into the pair of first gaps, the operating module moving in a first direction to carry the cylinder on the pair of catching arms, and then moving in a second direction to move out the cylinder from the frame, wherein the operating module, by moving relative to the printing region of the plate form, is adapted to extrude a building material filled in the body of the cylinder onto the printing region of the platform to be stacked layer by layer so as to build a three-dimensional object.

2. The three-dimensional printing apparatus of claim 1, wherein each of the catching arms comprises an engaging hook, and the pair of catching arms are adapted to engage the pair of wings with the engaging hooks, so as to detach the cylinder from the frame along the first direction or place the cylinder on the frame along an inverse direction of the first direction.

3. The three-dimensional printing apparatus of claim 1, wherein the operating module further comprises:
   a first moving unit, disposed on the platform, and the pair of catching arms being disposed on the first moving unit in order to move relative to the platform along a first axial direction by the first moving unit.

4. The three-dimensional printing apparatus of claim 3, wherein the operating module further comprises a pressing unit, disposed on one side of the pair of catching arms, and after the cylinder is carried on the pair of catching anus, the pressing unit moves relative to the pair of catching arms and pushes against the cylinder to secure the cylinder between the pressing unit and the catching arm.

5. The three-dimensional printing apparatus of claim 4, wherein the operating module further comprises a supporting ring, the pair of catching arms are located between the supporting ring and the first moving unit, and when the cylinder is carried on the pair of catching arms, at least a part of the cylinder is carried on the supporting ring.

6. The three-dimensional printing apparatus of claim 5, wherein the operating module further comprises an elastic member, connected between the pair of catching arms and the first moving unit, the elastic member constantly drives the pair of catching arms to move close to the first moving unit so that a second gap is provided between the cylinder and the supporting ring when the cylinder is carried on the pair of catching arms, and when the pressing unit pushes against the cylinder, the cylinder moves in a distance of the second gap to completely push against the supporting ring and deform the elastic member.

7. The three-dimensional printing apparatus of claim 5, wherein an inner wall of the supporting ring has a first inclined surface, a bottom of the cylinder has a second inclined surface, and the first inclined surface is corresponding to the second inclined surface and configured to guide the bottom of the cylinder to go through the supporting ring.

8. The three-dimensional printing apparatus of claim 4, wherein the operating module further comprises:
   a second moving unit, disposed on the platform, and the first moving unit being disposed on the second moving unit to move relative to the platform along a second axial direction by the second moving unit, wherein the second axial direction is perpendicular to the first axial direction, and the second direction is parallel to the second axial direction.

9. The three-dimensional printing apparatus of claim 4, wherein the operating module further comprises:
   a third moving unit, disposed on the platform, and the second moving unit being disposed on the third moving unit to move relative to the platform along a third axial direction by the third moving unit, wherein the third axial direction is perpendicular to the second axial direction and the first axial direction, and the first direction is parallel to the third axial direction.

10. The three-dimensional printing apparatus of claim 1, further comprising:
    at least one detecting unit, disposed on the frame and electrically connected to the operating module, and the detecting unit being configured to detect whether the cylinder is located on the frame.

11. The three-dimensional printing apparatus of claim 1, wherein the frame comprises a plurality of supporting arms arranged in intervals, each of the supporting arms has an engaging recess, and the cylinder is disposed between adjacent two of the supporting arms and carried on the frame by the pair of wings engaged with the engaging recesses of corresponding two of the supporting arms.

12. The three-dimensional printing apparatus of claim 11, wherein each of the supporting arms comprises a fixed part and a movable part, the fixed part is disposed on the inner side of the housing, the movable part is pivoted to the fixed part, the movable part is adapted to rotate relative to the fixed part by a force in order to move a protrusion of the movable part close to or away from a protrusion of the fixed part, and when the protrusion of the movable part moves close to and pushes against the protrusion of the fixed part, the protrusion of the movable part and the protrusion of the fixed part form the engaging recess.

13. The three-dimensional printing apparatus of claim 12, wherein after the cylinder is carried on the pair of catching arms, the operating module moves the cylinder in the second direction to push the movable part to rotate relative to the fixed part, such that the protrusion of the movable part is moved away from the protrusion of the fixed part and the cylinder is detached from the frame.

14. The three-dimensional printing apparatus of claim 12, wherein each of the supporting arms further comprise a repositioning member, connected between the fixed part and the movable part, and the repositioning member constantly drives the protrusion of the movable part to move close to and push against the protrusion of the fixed part.

15. The three-dimensional printing apparatus of claim 1, wherein the operating module moves in the first direction, such that the cylinder is carried on the pair of catching arms and detached from the frame.

\* \* \* \* \*